United States Patent [19]

Koster et al.

[11] Patent Number: 4,929,146

[45] Date of Patent: May 29, 1990

[54] MANIPULATOR

[75] Inventors: Marinus P. Koster; Willem Van Der Hoek; Nicolaas R. Kemper; Hermanus M. J. R. Soemers, all of Eindhoven, Netherlands

[73] Assignee: U.S. Philips Corporation, New York, N.Y.

[21] Appl. No.: 188,586

[22] Filed: Apr. 29, 1988

[30] Foreign Application Priority Data

Nov. 13, 1987 [NL] Netherlands .................. 8702715

[51] Int. Cl.$^5$ .............................................. B25J 18/00
[52] U.S. Cl. .................................. 414/744.5; 414/751; 414/917; 403/161; 74/469; 74/479; 74/105; 16/370; 16/223
[58] Field of Search ............... 414/751, 744.5, 917; 901/15, 27, 28, 23; 16/370, 223; 403/161, 119; 74/479, 105, 469

[56] References Cited

U.S. PATENT DOCUMENTS

| 4,341,502 | 7/1982 | Makino ........................ 414/744.5 |
| 4,648,785 | 3/1987 | Nakagawa et al. ............ 901/15 X |
| 4,674,947 | 6/1987 | Hamada et al. ............... 901/15 X |
| 4,712,971 | 12/1987 | Fyler ............................. 901/15 X |

Primary Examiner—Frank E. Werner
Assistant Examiner—Donald W. Underwood

[57] ABSTRACT

A manipulator having an end effector (1) displaceable by means of a four-rod mechanism, a comparatively light and stiff construction being obtained in that each of the rods (3,5,9,11) has a tubular support (73,79,159,181), which is secured by a bridge (147,149,169,191) to the bearing plate (87,93,119,193). The manipulator is particularly suitable for use in automatic mounting equipment.

8 Claims, 10 Drawing Sheets

MANIPULATOR

BACKGROUND OF THE INVENTION

The invention relates to a manipulator comprising an end effector displaceable by means of a four-rod mechanism, two of the four rods being rotatable about a main axis extending perpendicularly to the plane in which the displacement of the four relatively rotatable rods takes place.

In a manipulator of the kind mentioned in the opening paragraph known from European Patent Application EP-A1-0232930, to which U.S patent application Ser. No. 198,618 filed 5/20/88 corresponds, the four rods of the four-rod mechanism are tubular throughout the entire cross-section and substantially throughout the entire length of the rods. The rods are coupled to each other at the area of four pivot axes parallel to the main axis. This means that the rods, which have to be coupled to each other, should be very accurately aligned or registered at the area of the connections between the rods in order to avoid stresses in the construction.

In practice, such constructions must be adapted to fit after the manufacture of the parts to be interconnected due to the fact that the fully tubular rods are kinematically overconstrained.

SUMMARY OF THE INVENTION

The invention has for its object to provide a manipulator in which the disadvantages described are avoided.

For this purpose, the manipulator according to the invention is characterized in that each of the rods comprises a bearing plate, which is secured by a bridge extending parallel to the main axis to a tubular support and which is perpendicular to the main axis, while the tubular support and the bearing plate of successive rods coupled to each other are located alternatively on one and on the other side with repect to a common reference.

The invention is based on the recognition of the fact that constructions with a minimum number of constraints not only prevent stresses in the construction after mounting or adaptation to fit during mounting, but can also lead to a comparatively great stiffness with a comparatively small mass. Such a triple advantage is obtained in the manipulator according to the invention in that a cross-section of the rods is effectively subdivided into a tubular profile having a comparatively great torsional and bending stiffness and an adjoining plate-shaped profile, which has a comparatively low resistance to bending and torsion, but can absorb tensile and compressive forces.

A particular embodiment of the manipulator, in which the forces exerted on the end effector are optimally absorbed by the rods, is further characterized in that coaxially with respect to a pivot axis parallel to the main axis is arranged a screw spindle which is rotatable and displaceable by means of a first and second driving sleeve and is also supported via the driving sleeves and a ball-bearing in a first collar connected to the tubular support of a first rod and in a second collar connected to the tubular support of a second rod pivotably secured to the first rod, the first collar being supported by a ball-bearing in the bearing plate of the second rod, while the second collar is supported by a ball-bearing in the bearing plate of the first rod.

A further embodiment of the manipulator, in which the drive of the screw spindle for rotation and/or translation of the end effector is integrated with the kinematically non-overconstrained support of the screw spindle, is characterized in that each of the driving sleeves is coupled to a rotor of an electric motor, said rotor being provided with a permanent magnet which is rotatable within a stator coil secured to the tubular support of the relevant rod.

A still further embodiment of the manipulator, in which so-called transverse shearing forces are optimally passed through, is characterized in that the two rods rotatable about the main axis are secured at the area of their ends remote from the main axis to the remaining rods by means of a coupling member, which is comparatively stiff in a direction parallel to the main axis and is secured at one end to the tubular support of a rod rotatable about the main axis and is secured near its other end to the bearing plate of said rod, the bearing plate of the driven rod being supported via a ball-bearing by the tubular support of the remaining rod pivotably connected to the driven rod, while the bearing plate of the remaining rod is supported via a ball-bearing by the tubular support of the driven rod.

Another embodiment of the manipulator having a comparatively high resistance to so-called torsional moments is characterized in that in a third driven rod the tubular support is secured by a first bridge also constituted by a first stiffening pipe to the bearing plate, while in a fourth driven rod the tubular support is secured by a second bridge also constituted by a second stiffening pipe to the bearing plate, the centre lines of the two stiffening pipes being parallel to the main axis.

A further embodiment of the manipulator having a comparatively compact drive of the rods rotatable about the main axis is characterized in that the third and forurth driven rods are coupled to a first and a second motor drive, respectively, by means of a first and a second driving pipe, respectively, which are rotatable about a central column parallel to the main axis and are arranged concentrically with respect to each other, the first inner driving pipe being secured to the tubular support of the third rod, while the second outer driving pipe is secured to the bearing plate of the fourth rod.

The invention will be described more fully with reference to the drawing.

DESCRIPTION OF THE PREFERRED EMBODIMENT

Figure 1:
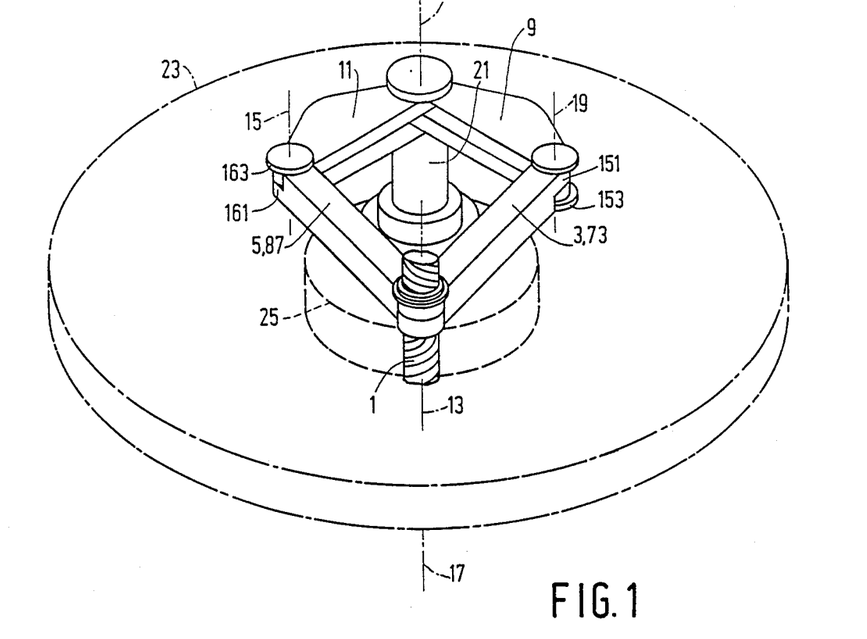
FIG. 1 is a perspective view of the manipulator.

The manipulator shown in FIG. 1 is of a kind known on itself from European Patent application No. 87200075.7 comprising a four-rod mechanism, which somprises two rods or lower arms 3 and 5 arranged near a screw spindle 1 and two rods or upper arms 9 and 11 arranged near a vertical main axis 7. A conventional end effector or gripper not shown for the sake of brevity is secured to the screw spindle. The screw spindle 1 may of course also be considered as an end effector. Of the rods 3,5,11 and 9 displaceable in a horizontal plane perpendicular to the main axis 7, the pairs of rods (3,5), (5,11), (11,9), (9,3) are relatively rotatable about vertical pivot axis 13,15,17 and 19, the pivot axis 13 coinciding with the centre line of the screw spindle 1 and the pivot axis 17 coinciding with the main axis 7. The lower arms 3,5 (first and second rod, respectively) are identical. This also applies to the upper arms 9,11 (third and fourth rod, respectively). The upper arms 9 and 11 can be driven at the area of a vertical column 21, whose main axis 7 constitutes the center line, by individual drives that will be described more fully hereinafter. The drive of the upper arms 9 and 11 is effected with radial or tangential movement of the screw spindle at angular velocities, whose absolute value is equal for both arms, but whose directions may be equal or opposite. In the case of an arbitrary non-radial or non-tangential movement, the absolute value of the said angular velocities is unequal. An outer cylinder 23 and an inner cylinder 25 determine the working space (envelope) of the manipulator, which is annular in a horizontal plane. The working space may of course also comprise a section of a ring or tube. Therefore, the term "annular working space" is to be interpreted in a wide sense. Both the lower arms and the upper arms are made of steel.

Figure 3:
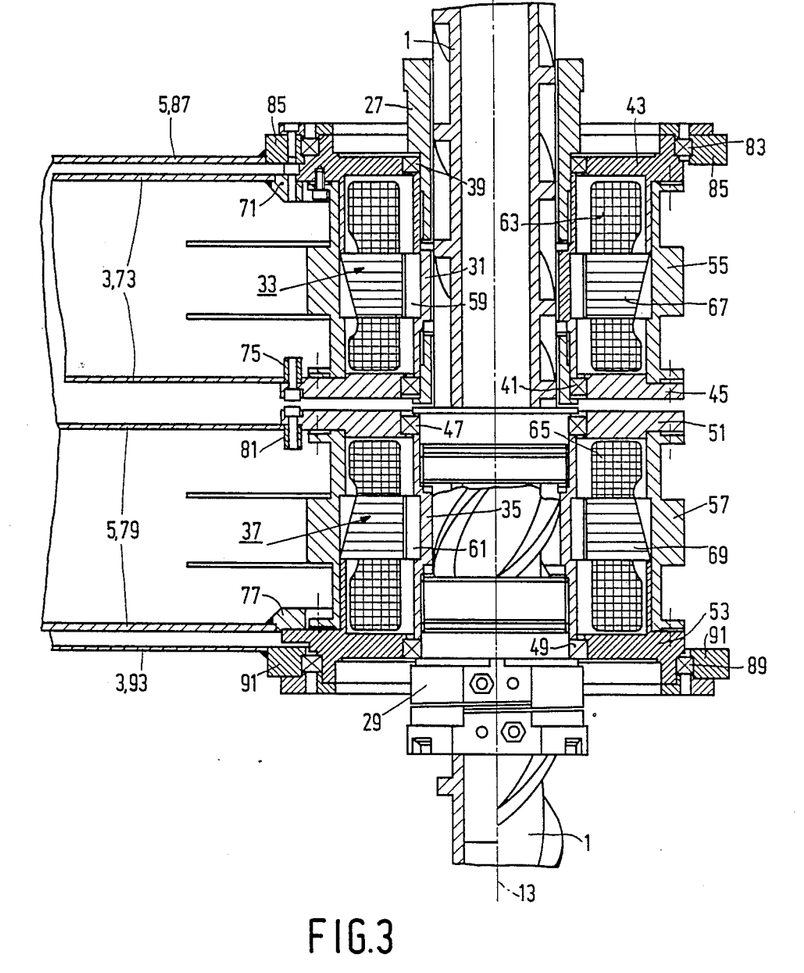
FIG. 3 is a sectional view of the connection between two rods near the screw spindle.
Figure 4:
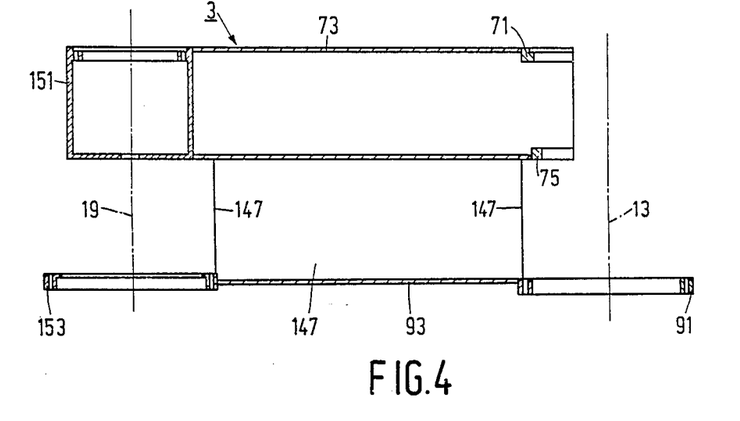
FIG. 4 is a longitudinal sectional view in a vertical plane of a rod arranged near the screw spindle.

As appears from FIG. 3, the screw spindle 1 is supported in a first driving sleeve 27 and a second driving sleeve 29. The driving sleeves 27 and 29 are arranged coaxially with respect to the pivot axis or rotary axis 13 and are guided by means of rollers not shown at the edges of the screw spindle 1. For further particulars with regard to the cooperation between the screw spindle 1 and the driving sleeves 27 and 29, reference is made to Netherlands Patent Application No. 8701183, (comma) to which U.S. Pat. application Ser. No. 136,582 filed 12/22/87 corresponds. The driving sleeve 27 is screwed into a rotor 31 of a first electric motor 33 coaxial with respect to the rotary axis 13 and the driving sleeve 29 is screwed into a rotor 35 of a second electric motor 37 coaxial with respect to the rotary axis 13. By means of ball-bearings 39 and 41, the combination of the first driving sleeve 27 and the rotor 31 is rotatable in a first collar 43 and a first plate-shaped ring 45, respectively. The combination of the second driving sleeve 29 and the rotor 35 is also rotatable by means of ball-bearings 47 and 49 in a second plate-shaped ring 51 and a second collar 53, respectively. A first tubular motor housing 55 of the first electric motor 33 is screwed to the first collar 43 and the first ring 45. A second tubular motor housing 57 of the second electric motor 37 is screwed to the second collar 53 and the second ring 51. On the rotors 31 and 35 of the electric motors 33 and 37, respectively, are secured permanent magnets 59 and 61, respectively, which are rotatable within stators 67 and 69 provided with coils 63 and 65 and connected to the motor housings 55 and 57. The motor housing 55 is secured on the upper side by means of screw connections to a ring segment 71, which is welded to a tubular support 73 of the first rod or lower arm 3. On the lower side, the motor housing 55 is secured by means of screw connections to a ring segment 75, which is also welded to the tubular support 73 of the first rod or lower arm 3. The motor housing 57 is secured on the lower side by means of screw connections to a ring segment 77, which is welded to a tubular support 79 of the second rod or lower arm 5. On the upper side, the motor housing 57 is secured by means of screw connections to a ring segment 81, which is also welded to the tubular support 79 of the second rod or lower arm 5. The first collar 43 is supported by a ball-bearing 83 in a ring 85, which is screwed to a bearing plate 87 forming part of the second rod or lower arm 5. The second collar 53 is supported by a ball-bearing 89 in a ring 91, which is screwed to a bearing plate 93 forming part of the first rod or lower arm 3. Thus, it is achieved that the rotors 31 and 35 are rotatable about the rotary axis 13 in the same direction or in opposite directions with repect to the motor housings 55 and 57, while at the same time the lower arms 3 and 5 with their motor housings 55 and 57 are relatively rotatable about the pivot axis 13.

The lower arms 3 and 5 are connected at the area of the pivot axes 19 and 15 to the upper arms 9 and 11.

It will be explained with reference to FIGS. 4 to 9 how the lower arm 3 is connected to the upper arm 9. In principle, the connection of the lower arm 5 with the upper arm 11 is equal thereto. As appears from FIG. 9, the lower arm 3 and the upper arm 9 are secured to each other by means of a coupling member 95 comparatively stiff in a direction parallel to the main axis 7 in the form of a circular shaft having two ends 97 and 99 provided with threaded holes. The coupling member 95 is further provided with two shoulders 101 and 103 pressed agsainst a first cone 105 and a second cone 107, respectively, by means of nuts 109 and 111 screwed on to the ends 97 and 99, respectively. The cones 105 and 107 have a flat edge 113 and a flat edge 115, respectively, which serve as means for securing to the upper arm 9. By means of bolts 117, the cone 105 is screwed to a bearing plate 119 of the upper arm 9, while the cone 107 is screwed by means of bolts 121 to a tubular support 123 of the upper arm 9. By means of bolts 125, a supporting ring 127 is secured to the tubular support 73 of the lower arm 3 for a ball-bearing 129, which is further supported on the bearing plate 119 of the upper arm 9. By means of the bolts 121, a supporting ring 131 is also secured to the tubular support 123 of the upper arm 9 for a ball-bearing 133, which is further supported on a tubular support 123 of the upper arm 9. By means of bolts 125, a supporting ring 127 is secured to the tubular support 73 of the lower arm 3 for a ball-bearing 129, which is further supported on the bearing plate 119 of the upper arm 9. By means of the bolts 121, a supporting ring 131 is also secured to the tubular support 123 of the upper arm 9 for a ball-bearing 133, which is further supported in the bearing plate 93 of the lower arm 3. The ball-bearing 129 has a so-called labyrinth seal, which is constituted by two engaging rings 135 and 137, of which the ring 137 is screwed onto the supporting ring 127. The ball-bearing 133 also has a labyrinth seal constituted by engaging rings 139 and 141, of which the ring 141 is screwed onto the supporting ring 131. The ring 135 is enclosed by a shoulder in the flat edge 113 of the cone 105, while the ring 139 is enclosed by a washer, which is provided with a shoulder and is secured by means of bolts 145 to the bearing plate 93 of the lower arm 3. It should be noted that the cones 105 and 107 also have a comparatively great stiffness in a direction parallel to the main axis 7. In principle, the lower arm 5 and the upper arm 11 are connected to each other at the area of the pivot axis 19 in the same manner as the arms 3 and 9 (see also FIG. 2).

Figure 5:
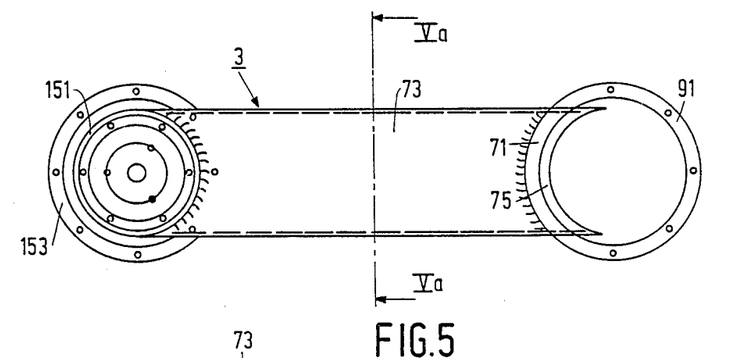
FIG. 5 is a plan view of the rod shown in FIG. 4.
Figure 5A:
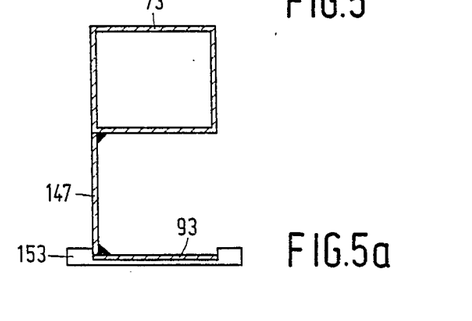
FIG. 5a is a sectional view taken on the line Va—Va in FIG. 5.
Figure 6:
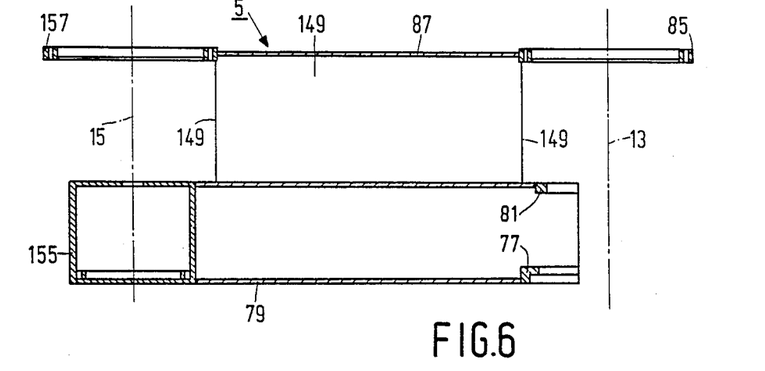
FIG. 6 is a longitudinal sectional view in a vertical plane of the other rod arranged near the screw spindle.
Figure 7:
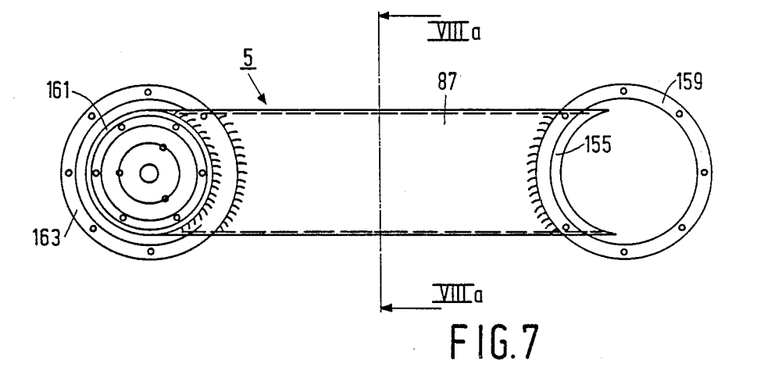
FIG. 7 is a bottom view of the rod shown in FIG. 6.
Figure 7A:
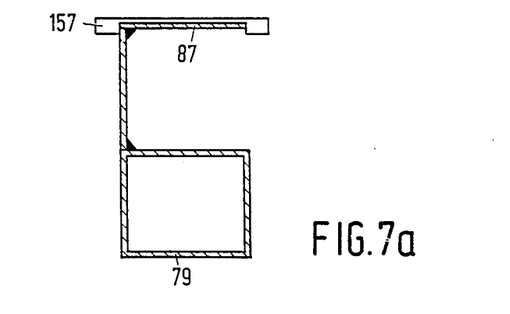
FIG. 7a is a sectional view taken on the line VIIa—VIIa in FIG. 7.
Figure 8:
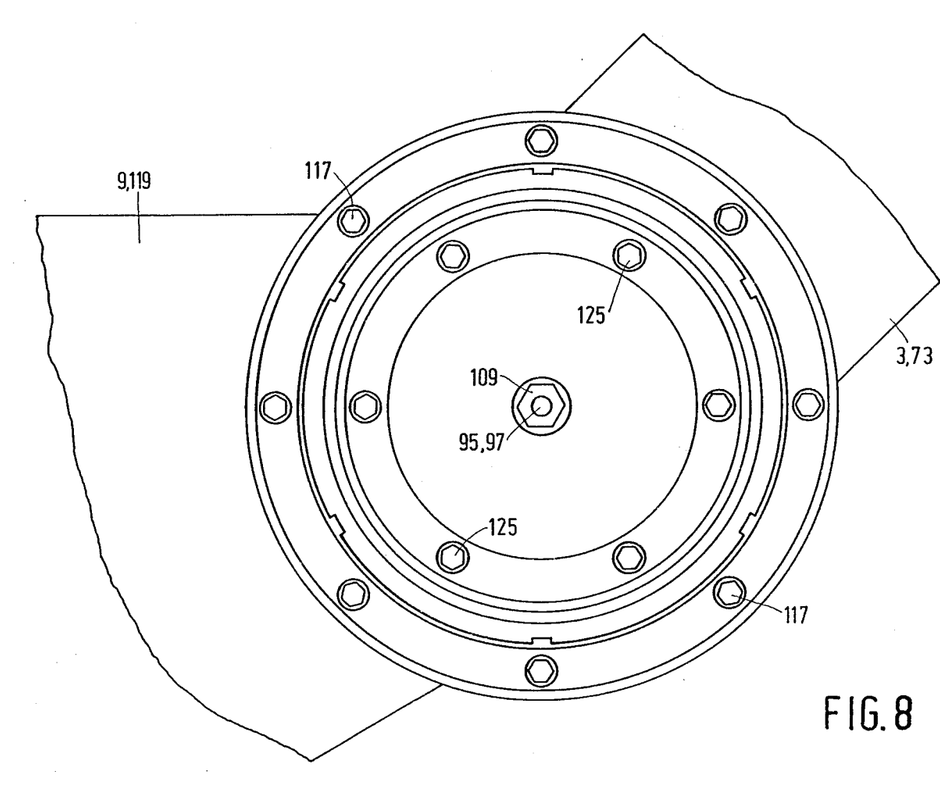
FIG. 8 is a plan view of a connection between two rods located between the screw spindle and the main axis.
Figure 9:
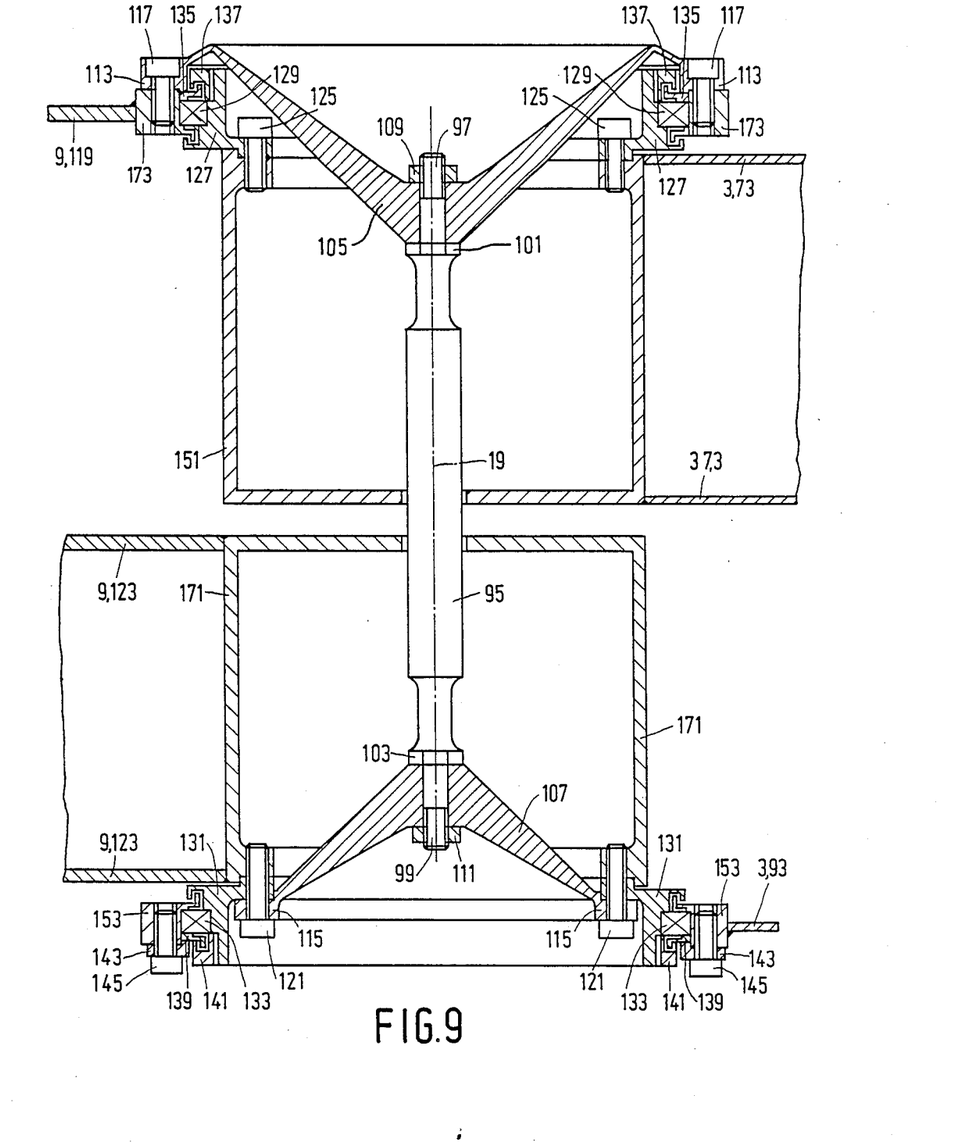
FIG. 9 is a sectional view in a vertical plan of the connection shown in FIG. 8.

As has already appeared from the foregoing, both the lower arms and the upper arms have tubular supports and bearing plates. The tubular supports and the bearing plates are interconnected by so-csalled bridge plates (bridges) extending in flat planes parallel to the main axis 7. For example, the tubular supports 73 (FIG. 4) and 79 (FIG. 6) of the lower arms 3 and 5 are secured by means of bridge plates 147 and 149 to the bearing plates 93 and 87. The bridge plates 147 and 149 may be welded to the repective tubular supports and bearing plates. Preferably, the bridge plate and the bearing plate of a lower arm are made from one piece of sheet material by bending them rectangularly. In a sectional view at right angles to the longitudinal direction of a lower arm, an L-shaped plate is then obtained, which is welded on one side to the associated tubular support of rectangular cross-section and is self-supporting on the other side. The bridge plates 147 and 149 are situated on the outer side of the manupulator so that, viewed from the outside, in FIG. 1, a closed construction is obtained. On the side located near the pivot axis 13, the lower arm 3 is provided, as stated, with ring segments 71,75 and a ring 91, which are welded to the support 73 and to the plate 93, respectively. On the side located near the pivot axis 19, the lower arm 3 is provided with a tubular cylindrical support member 151 and a washer 153 (FIG. 5). The support member 151 is welded to the support 73, while the washer 153 is welded to the plate 93. As appears from FIG. 9, the ball-bearing 133 is enclosed by the supporting ring 131 and the washer 153. On the side located near the pivot axis 13 (FIG. 6), the lower arm 5 is provided with the ring segments 77,81 and the ring 85, which are welded to the support 79 and to the plate 87, respectively. On the side located near the pivot axis 15, the lower arm 5 is provided with a tubular cylindrical support member 155 and a washer 157. For the sake of brevity, the connection between the lower arm 5 and the upper arm 11 is not shown.

Figure 2:
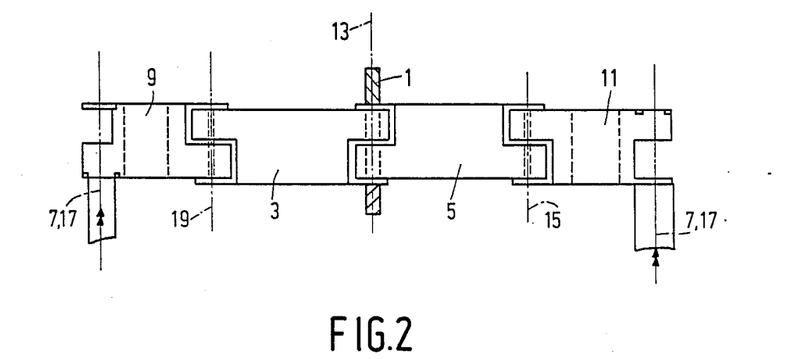
FIG. 2 is a diagrammatic developed view of the four-rod mechanism of the manipulator shown in FIG. 1.

As appears from FIGS. 1 and 2, the interconnected lower arm 3 and lower arm 5 are located with respect to a common reference so that the tubular support and the bearing plate of successive rods (arms 3,5) are located alternately on one and on the other side, at the interconnection end the tubular support and bearing plate of one rod defining a recess within which the tubular support end of the other rod fits. Such a common reference may be, for example, a horizontal plane located about halfway between the tubular supports of successive rods. Thus, a very light, stiff and compact construction is obtained with a comparatively small constructional height of the four-rod mechanism. The configuration described will be explained more fully hereinafter in the further description of the construction of the upper arms 9 and 11.

The upper arm 9 shown in FIGS. 1, 2, 9, 10 and 11 in principle has the same construction as the lower arms 3 and 5, that is to say that it has a tubular support, which is connected by a bridge or bridge plate to a bearing plate. With respect to the lower arms 3 and 5, the configuration of the upper arms 9 and 11 is more complicated, however. The upper arm or third rod 9 has a tubular support 159, which is composed of an assembly of vertical plates 159a, 159b, 159c, 159d parallel to the main axis 7, a horizontal plate 159e perpendicular to the main axis, two horizontal plate segments 159f, 159g and a vertical tubular section 159h between the reference numerals 161, 163, which extends from the plate 159e to a boundary line 165 indicated in FIG. 10 by a dotted line. The tubular section 159h forms part of a torsion cylinder 167 (first stiffening pipe), whose centre line is parallel to the main axis 7. The torsion cylinder 167 has a further tubular section 169, which is located above the boundary line 165 and forms the bridge between the tubular support 159 and the bearing plate 119. At the end located near the pivot axis 19, the upperarm 9 is provided with a tubular cylindrical support member 171 and a supporting ring 173 for the ball-bearing 129 (cf.FIG. 9). The cylindrical support member 171 is welded to the tubular support 159, while the supporting ring 173 is welded to the bearing plate 119. At the end located near the pivot axis 17, the upper arm 9 is provided by welding connections with a tubular cylindrical support member 175 and a supporting ring 177. The plates 159a–d are welded to the plate 159e, the plate segments 159f, 159g, the torsion cylinder 167 and the cylindrical support members 171 and 175. The torsion cylinder 167 is welded on the lower side to the plate 159e and on the upper side to the bearing plate 119. Further, the upper arm 9 is provided with a vertical cover plate 179 (FIG. 11), which is welded to the support members (171, 175), the plate 159e and the bearing plate 119. The cover plate 179 provides for an additional stiffness and a less angular contour of the upper arm 9, but is not necessary for all the applications of the manipulator.

The upper arm 11 shown in FIGS. 1, 2, 12 and 13 has in principle the same construction as the upper arm 9 already described. The tubular support is now situated above instead of below the bearing plate, however. The upper arm of fourth rod 11 has a tubular support 181, which is composed of an assembly of vertical plates 181a, 181b, 181c, 181d parallel to the main axis 7, a horizontal plate 181e perpendicular to the main axis, to horizontal plate segments 181f, 181g and a vertical tubular section 181h between the reference numerals 183, 185, which extends from the plate 181e to a boundary line 187 indicated in FIG. 12 by a dotted line. The tubular section 181h forms part of a torsion cylinder 189 (second stiffening pipe), whose centre line is parallel to the main axis 7. The torsion cylinder 189 further has a tubular section 191, which is located below the boundary line 187 and forms the bridge between the tubular support 181 and a bearing plate 193. At the end located near the pivot axis 15, the upper arm 11 is provided with a cylindrical support member 195 and a supporting ring 197 for a ball-bearing, which for the sake of brevity is not shown in a Figure analogous to FIG. 9 at the area of the pivot axis 15. The cylindrical support member 195 is welded to the tubular support 181, while the supporting ring 197 is welded to the bearing plate 193. At the end located near the pivot axis 17, the upper arm 11 is provided by welding connections with a cylindrical support member 199 and a supporting ring 201. Further, the upper arm 11 is provided with a vertical cover plate 203. The connections between plates, cylinder and cylindrical support members are analogous to those of the upper arm 9 and are therefore not described further.

Figure 10:
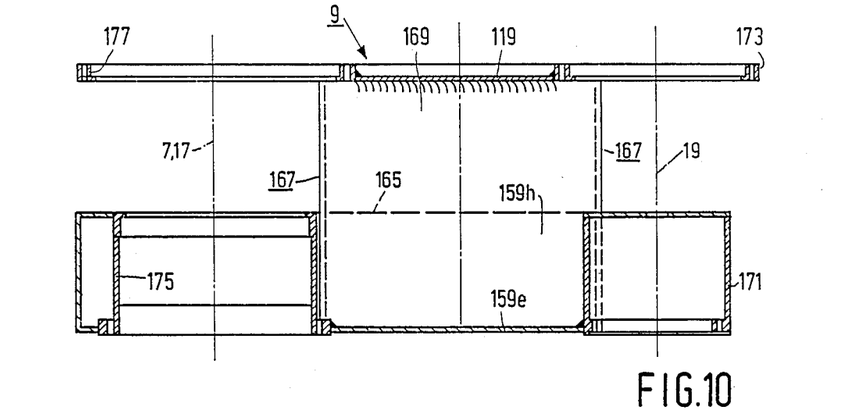
FIG. 10 is a longitudinal sectional view in a vertical plane or a rod arranged near the main axis.
Figure 11:
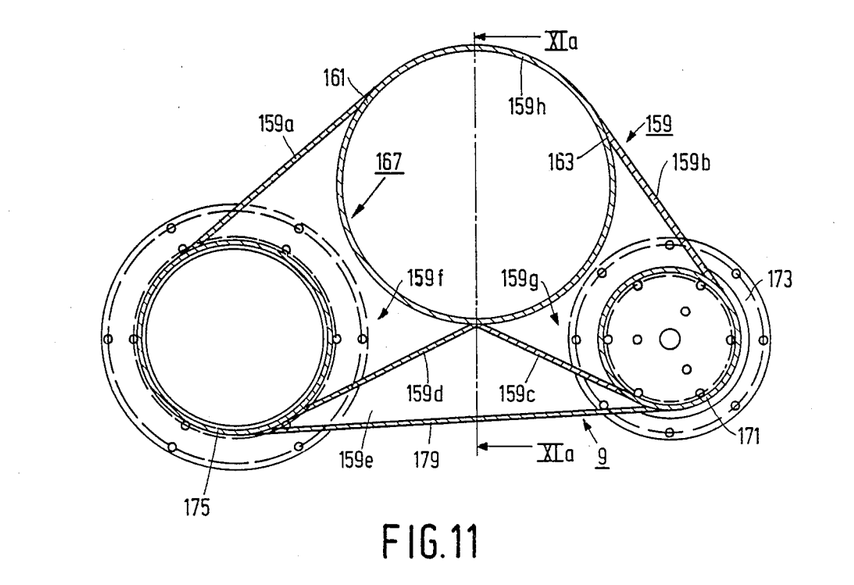
FIG. 11 is a longitudinal sectional view in a horizontal plane of the rod shown in FIG. 10.
Figure 11A:
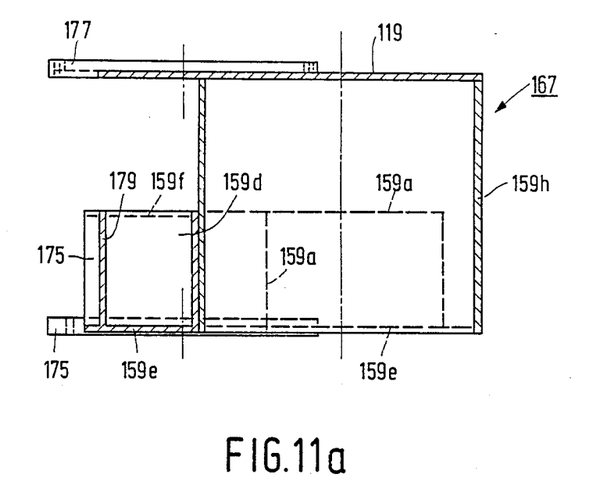
FIG. 11a is a sectional view taken on the line XIA—XIa in FIG. 11.
Figure 12:
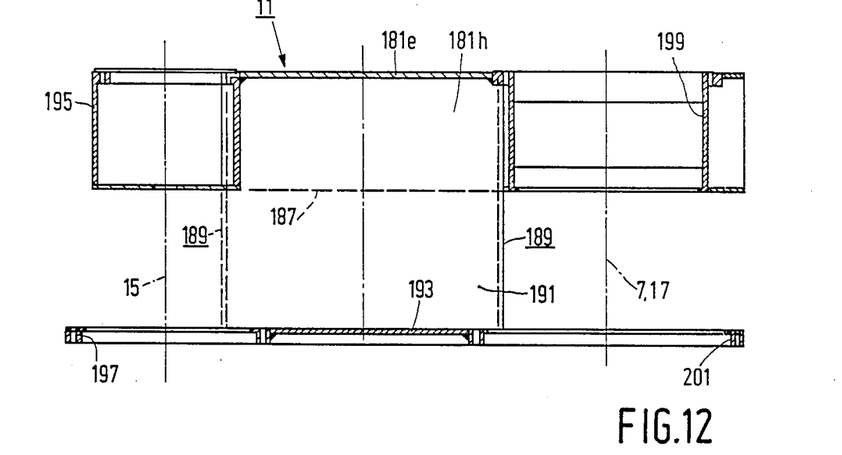
FIG. 12 is a longitudinal sectional view in a vertical plane of the other rod arranged near the main axis.
Figure 13:
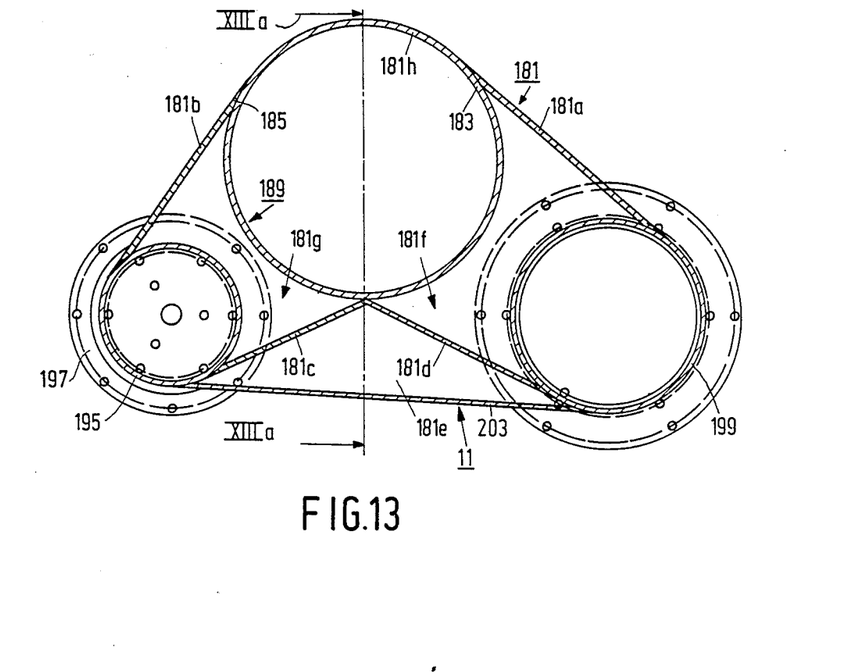
FIG. 13 is a longitudinal sectional view in a horizontal plane of the rod shown in FIG. 12.
Figure 13A:
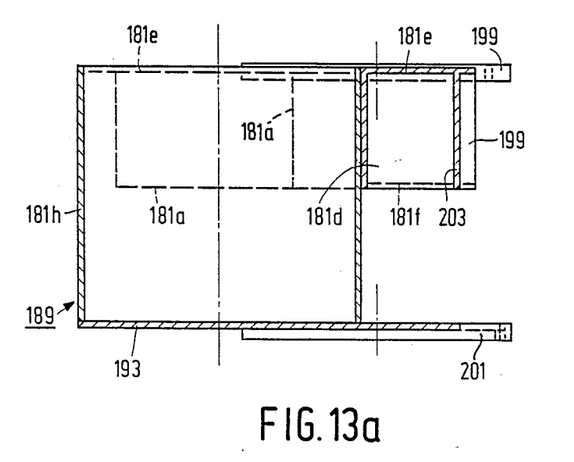
FIG. 13a is a sectional view taken on the line XIIIa—XIIIa in FIG. 13.

It should be noted that the sectional views of FIGS. 10 and 12 are formed in planes perpendicular to the plane of the drawing in FIGS. 11 and 13, but are shown in projection for saving space. This results in that the plate segments 159f, 159g and 181f, 181g in FIGS. 10 and 12, respectively, are not visible.

Figure 14:
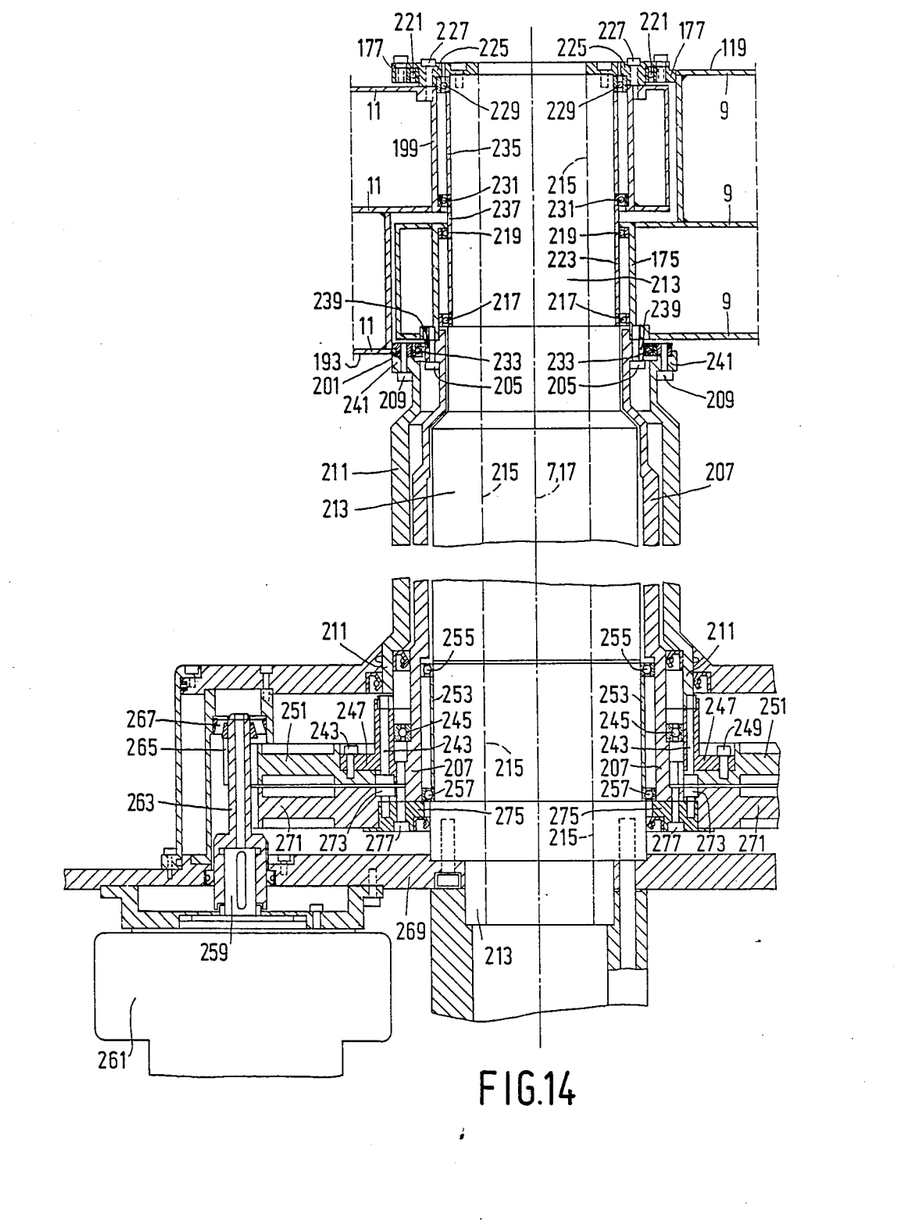
FIG. 14 is as sectional view in a vertical plane of a connection between the two rods arranged near the main axis with the associated drives.

As appears from FIG. 14, the upper arm or third rod 9 is screwed by bolts 205 to a first inner driving pipe 207, while the upper arm or fourth rod 11 is screwed by bolts 209 to a second outer driving pipe 211. The driving pipes 207 and 211 are rotatable about a central column 213 in the form of a thick-walled pipe, whose inner wall is indicated by dotted lines 215. The driving pipes 207, 211 and the central column 213 thus form part of the aforementioned column 21 (cf. FIG. 1). In FIG. 14, the central column 213 is shown in elevation. The upper arm 9 is rotatable about the column 213 by means of ball-bearings 217, 219 and 221, the ball-bearings 217 and 219 being mutually separated by a spacer sleeve 223. The ball-bearing 221 is supported in the supporting ring 177 welded to the bearing plate 119 and is enclosed by a ring 225, which is screwed by bolts 227 to the upper arm 11. The upper arm 11 is rotatable about the column 213 by means of ball-bearings 229, 231 and 233, the ball-bearings 229 and 231 being mutually separated by a spacer sleeve 235. The ball-bearings 219 and 231 are mutually separated by a spacer sleeve 237. The ball-bearing 233 is supported in the supporting ring 201 which is welded to the bearing plate 193 and is enclosed by a flange 239 of the inner driving pipe 207 and a flange 241 of the outer driving pipe 211. In principle, the tubular support of the upper arm or third rod 9 is therefore secured to the first inner driving pipe 207, while the bearing plate of the upper arm or fourth rod 11 is secured by the supporting ring 201 to the second outer driving pipe 211.

Since the motor drives of the driving pipes 207 and 211 are analogous, only the drive of the outer driving pipe 211 will be described. For considerations of space, only a part of the drive of the inner driving pipe 207 is shown in FIG. 14.

The outer driving pipe 211 is secured by means of bolts 243 to a sleeve 247, which is rotatable by means of a ball-bearing 245 about the main axis 7 and is screwed by bolts 249 to a gearwheel 251. The ball-bearing 245 is supported by a spacer sleeve 253, which surrounds the central column 213 and is arranged between a ball-bearing 255 and a ball-bearing 257, by which the inner driving pipe 207 is rotatably journalled around the column 213. On an outgoing shaft 259 of a second driving motor 261 is secured a pinion shaft 263, on which is located a pinion 265, which is in engagement with the gearwheel 251. The pinion shaft 263 is journalled in a ball-bearing 267. Both the second driving motor 261 for the outer driving pipe 211 of the upper arm 11 and the first driving motor (not shown in FIG. 14) for the inner driving pipe 207 of the upper arm 9 are secured on a base plate 269 on either side of the central column 213. In FIG. 14, of the drive of the inner driving pipe 207 a gearwheel 271 is visible, which is in engagement with a pinion corresponding to the pinion 265. The gearwheel 271 is secured by bolts 273 on a ring 275, which is screwed by bolts 277 the the inner driving pipe 207. The driving motors for the two driving pipes are preferably identical.

The constructions described above of lower arms 3,5 and upper arms 9,11 not only have a comparatively small mass, but also a comparatively high load capacity. With regard to the load capacity, it should be noted that all the so-called radial forces (radial with respect to the main axis 7), which are exerted, for example, by an end effector and a screw spindle 1 on the four-rod mechanism, are passed through the upper and lower surfaces of the lower arms and the upper arms. The respective plate portions of the rods are substantially in line with each other so that comparatively thin and wide plates can pass the forces satisfactorily. The so-called axial forces (parallel to the main axis 7) are passed through via the vertical plate portions of the lower and upper arms, which can be subjected to shear and bending force. At the area of the pivot axes 15 and 19, the coupling member 95 (cf. FIG. 9) comparatively stiff in a direction parallel to the main axis 7 ensures that the axial forces csan be passed through satisfactorily. The so-called torques or bending moments exerted on the screw spindle 1 can be interpreted as a combination of the radial and axial forces which are passed through, as described. The four-rod mechanism also has a very high resistance to torsion due to the presence of the tubular supports. The symmetrical construction of the manipulator moreover offers the advantage of a favourable distribution of the forces and of a favourable load of the motor drives. Finally, it should be noted that the construction of the manipulator as a whole is not kinematically overconstrained. This leads not only to a simple mounting of the four-rod mechanism, but also offers the great advantage that the construction of the manipulator in itself does not give rise to an additional internal load, which is superimposed on the external load caused by the operation of the manipulator.

What is claimed is:

1. A manipulator comprising an end effector and a four rod mechanism with each rod coupled to two of the other three rods, said four rods being capable of moving said end effector in a predetermined plane, two of said four rods being rotatable about a main axis extending perpendicularly to said predetermined plane, each of said rods comprising a bearing plate, a tubular section and a bridge between said bearing plate and said tubular section, said bridge extending parallel to said main axis, each said bearing plate being in a respective plane which is perpendicular to said main axis, and, for each said rod, the respective bearing plate and tubular section being disposed to opposite sides of a common reference plane extending parallel to said predetermined plane, said tubular sections of rods coupled to each other being located on opposite sides of said common reference plane.

2. A manipulator as claimed in claim 1, in which said four rods are relatively rotatable about said main axis and three pivot axes parallel to said main axis, comprising a screw spindle arranged coaxially with respect to a pivot axis parallel to said main axis; first and second driving sleeves for rotating and displacing said screw spindle; a first collar with a ball-bearing, said first collar being connected to a tubular section of a first rod for cooperating with said first one of said driving sleeves to support said screw spindle; and a second collar having a ball-bearing, said second collar being connected to a tubular section of a second rod for cooperating with said second of said driving sleeves for supporting said screw spindle, said first rod being secured to said second rod, said first collar being supported by a ball-bearing in the bearing plate of said second rod and said second collar being supported by a ball-bearing in the bearing plate of said first rod.

3. A manipulator as claimed in claim 2 wherein each of the driving sleeves is coupled to an associated rotor of an electric motor, each said rotor being provided with a permanent magnet which is rotatable within a stator coil secured to the tubular section of the rod associated with its driving sleeve.

4. A manipulator as claimed in claim 1 or 2 wherein a coupling member secures each of said two rods rotatable about the main axis at its end remote from said main axis to one of the other two rods, each said coupling member being comparatively stiff in a direction parallel to the main axis and being secured at one end to a tubular section of a rod rotatable about the main axis, each said coupling member being secured at its other end to the bearing plate of its associated rod rotatable about said main axis, said bearing plate of each rod rotatable about said main axis being supported through a ball-bearing by a tubular section of its associated other rod, said bearing plate of each other rod being supported through a ball-bearing by a tubular section of its associated rod rotatable about said main axis.

5. A manipulator comprising an end effector and a four rod mechanism with each rod coupled to two of the other three rods, said four rods being capable of moving said end effector in a predetermined plane, two of said four rods being rotatable about a main axis extending perpendicularly to said predetermined plane, each of said rods comprising a bearing plate, a tubular section and a bridge between said bearing plate and said tubular section, said bridge extending parallel to said main axis, each said bearing plate being in a respective plane which is perpendicular to said main axis, and each of said rods having an end with a recess defined between the respective tubular section and bearing plate, each said recess of a coupled rod receiving the tubular section of an associated coupled rod.

6. A manipulator as claimed in claim 5, in which said four rods are relatively rotatable about said main axis and three pivot axes parallel to said main axis, comprising a screw spindle arranged coaxially with respect to a pivot axis parallel to said main axis; first and second driving sleeves for rotating and displacing said screw spindle; a first collar with a ball-bearing, said first collar being connected to a tubular section of a first rod for cooperating with said first of said driving sleeves to support said screw spindle; and a second collar having a ball-bearing, said second collar being connected to a tubular section of a second rod for cooperating with a second of said driving sleeves for supporting said screw spindle, said first rod being secured to said second rod, said first collar being supported by a ball-bearing in the bearing plate of said second rod and said second collar being supported by a ball-bearing in the bearing plate of said first rod.

7. A manipulator as claimed in claim 6 wherein each of the driving sleeves is coupled to an associated rotor of an electric motor, each said rotor being provided with a permanent magnet which is rotatable within a stator coil secured to the tubular section of the rod associated with its driving sleeve.

8. A manipulator as claimed in claims 5 or 6, wherein a coupling member secures each of said two rods rotatable about the main axis at its end remote from the main axis to one of the other two rods, each said coupling member being comparatively stiff in a direction parallel to the main axis and being secured at one end to a tubular section of a rod rotatable about the main axis, each said coupling member being secured at its other end to the bearing plate of its associated rod rotatable about said main axis, said bearing plate of each rod rotatable about said main axis being supported through a ball-bearing by a tubular section of its associated other rod, said bearing plate of each other rod being supported through a ball-bearing by a tubular section of its associated rod rotatable about said main axis.

* * * * *